United States Patent [19]
Kuo

[11] Patent Number: 5,424,087
[45] Date of Patent: Jun. 13, 1995

[54] METHOD OF STERILIZING CANNED FOOD IN STERILIZING KETTLE

[75] Inventor: Tsai-Shu Kuo, Taipei, Taiwan, Prov. of China

[73] Assignee: China Technical Consultants, Inc., Taipei, Taiwan, Prov. of China

[21] Appl. No.: 131,675

[22] Filed: Oct. 5, 1993

[51] Int. Cl.$^6$ ................................ A23L 3/10
[52] U.S. Cl. ................................ 426/407; 426/412; 426/232; 422/26; 422/302; 422/307
[58] Field of Search ........... 426/407, 412, 232; 99/359, 370; 422/26, 302, 307, 292

[56] References Cited

U.S. PATENT DOCUMENTS

| | | | |
|---|---|---|---|
| 2,082,460 | 6/1937 | Omsted | 99/370 |
| 2,649,380 | 8/1953 | Flynn | 426/407 |
| 3,473,934 | 10/1969 | Pech | 426/407 |
| 4,003,302 | 1/1977 | Mencacci et al. | 426/407 |
| 4,088,444 | 5/1978 | Byrne | 426/407 |
| 4,092,111 | 5/1978 | Gagnoux et al. | 99/359 |
| 4,164,590 | 8/1979 | Mencacci | 426/407 |
| 4,331,633 | 5/1982 | Lathrop | 426/407 |
| 4,693,902 | 9/1987 | Richmond et al. | 426/407 |
| 4,816,269 | 3/1989 | Nelson et al. | 426/407 |
| 4,841,457 | 6/1989 | Clyne et al. | 426/407 |
| 4,849,235 | 7/1989 | Braymand | 426/407 |
| 4,874,580 | 10/1989 | Sugisawa et al. | 426/407 |
| 5,280,748 | 1/1994 | Pardo | 99/370 |
| 5,283,033 | 2/1994 | Dodrill | 426/407 |

*Primary Examiner*—Steven Weinstein
*Attorney, Agent, or Firm*—Bacon & Thomas

[57] ABSTRACT

An energy efficient method of sterilizing canned food in a sterilizing kettle comprises the use of 95° C. hot water, which is kept in a first reservoir, to expel the air in a sterilizing kettle containing the canned food to be sterilized and to preheat the kettle and the canned food. The 95° C. hot water is cooled to become 85° C. hot water, which is then drained out of the kettle to be kept in a second reservoir. Thereafter, steam is injected into the kettle to sterilize the canned food. The 85° C. hot water kept in the second reservoir is then introduced into the kettle in which the 85° C. hot water is converted by a heat exchange to the 95° C. hot water, which is then drained and kept in the first reservoir for use again in the next sterilization cycle.

1 Claim, 1 Drawing Sheet

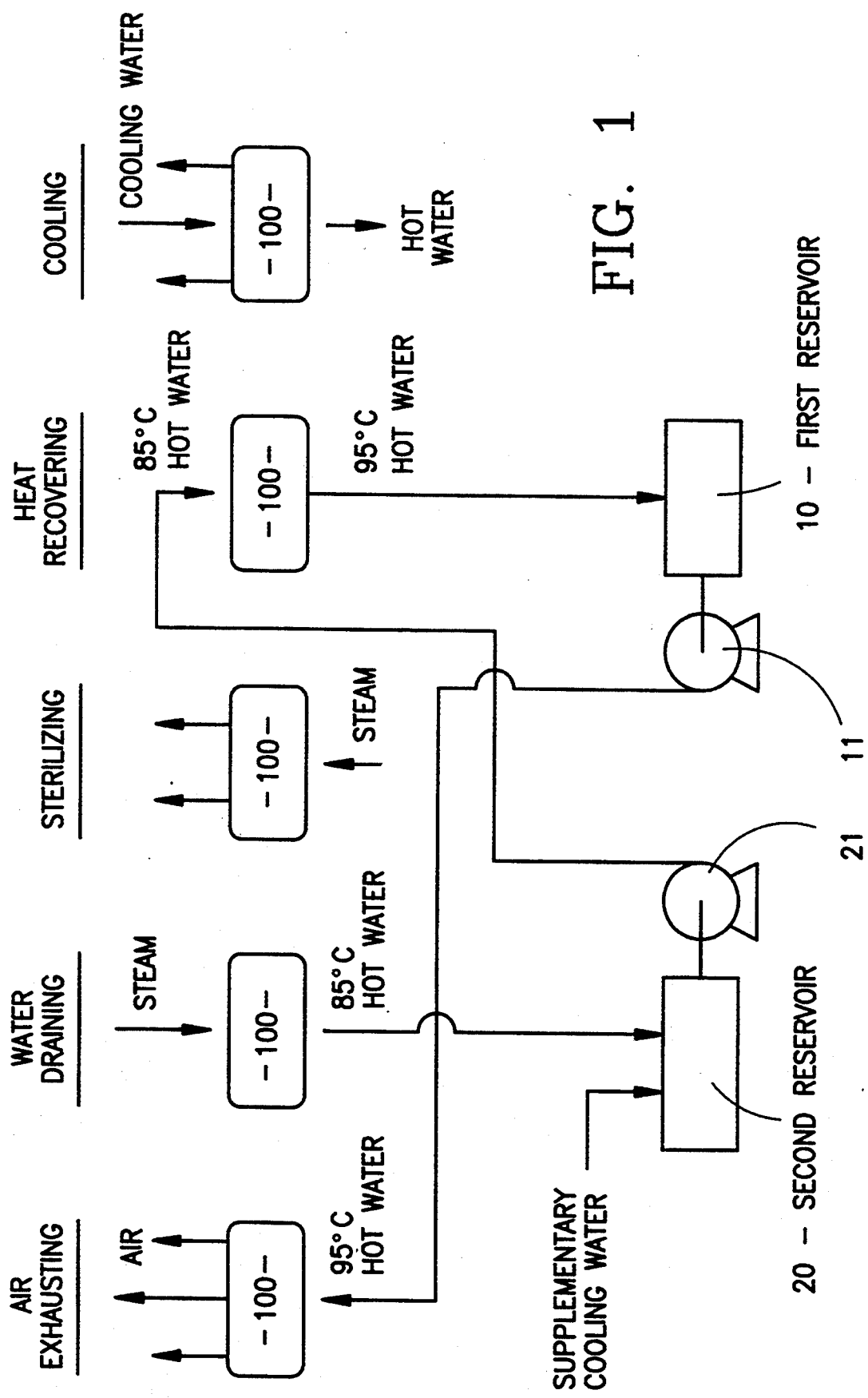

METHOD OF STERILIZING CANNED FOOD IN STERILIZING KETTLE

FIELD OF THE INVENTION

The present invention relates generally to a method of sterilizing the canned food, and more particularly to an improved method of sterilizing the canned food in a sterilizing kettle.

BACKGROUND OF THE INVENTION

In general, the conventional method of sterilizing the canned food involves the use of steam to expel the air in a sterilizing kettle until such time when the content of air in the sterilizing kettle drops to a certain level and when the temperature in the sterilizing kettle conforms to a given standard. Thereafter, the steam is introduced continuously into the sterilizing kettle so that the temperature in the sterilizing kettle is increased to reach a given level at which the living microorganisms in the canned food are killed. Upon the completion of such a sterilizing process as described above, the canned food so sterilized is finally subjected to a pressurized cooling or water cooling as required.

The conventional steam method of sterilizing the canned food is not cost-effective, in view of the fact that the steam used to expel the air in the sterilizing kettle amounts to almost one third of the total of the steam which is used in the entire process of sterilizing the canned food, and that the steam left in the sterilizing kettle is finally released into the atmosphere at the conclusion of the sterilizing process. It is readily apparent that the used steam is not recycled at any given stage of the conventional sterilizing process of the canned food. In other words, the energy efficiency of the above-mentioned conventional method of sterilizing the canned food remains to be improved.

SUMMARY OF THE INVENTION

It is therefore the primary objective of the present invention to provide an improved method of sterilizing the canned food in a sterilizing kettle, which is so energy efficient that the cost of sterilizing the canned food is effectively controlled.

The foregoing objective of the present invention is attained by the improved method, which comprises the following steps of:

(a) introducing 95° C. hot water from a first reservoir into a sterilizing kettle containing therein canned food intended to be sterilized, so as to cause the air in the sterilizing kettle to be discharged until such time when the sterilizing kettle is substantially full of the 95° C. hot water and when the air in the sterilizing kettle is substantially completely expelled, thereby resulting in the temperature of the 95° C. hot water dropping from 95° C. to about 85° C. in view of the fact that the 95° C. hot water is used to preheat the canned food as well as the sterilizing kettle;

(b) draining completely 85° C. hot water from the sterilizing kettle to a second reservoir until such time when the sterilizing kettle is free from the 85° C. hot water, and introducing simultaneously steam into the sterilizing kettle at the top of the sterilizing kettle at the time when the step of draining the 85° C. hot water is started, so as to place the sterilizing kettle under a positive pressure preventing the atmospheric air from entering the sterilizing kettle;

(c) injecting the steam into the sterilizing kettle continuously until such time when temperature in the sterilizing kettle reaches a predetermined level at which the living microorganisms in the canned food are killed, with the temperature in the sterilizing kettle being kept persistently at the predetermined level for a predetermined period of time before the step of injecting the steam into the sterilizing kettle is concluded;

(d) introducing the 85° C. hot water from the second reservoir into the sterilizing kettle by spraying the 85° C. hot water at the top of the sterilizing kettle to cool the steam in the sterilizing kettle and to heat exchange with the heated sterilizing kettle and with the heated canned food, thereby causing the 85° C. hot water to be warmed up to about 95° C., wherein the quantity of the 85° C. hot water sprayed into the sterilizing kettle is about equal to the quantity of the 95° C. hot water that was introduced into the sterilizing kettle in the step (a), and the warmed 95° C. hot water is drained at the bottom of the sterilizing kettle into the first reservoir; and (e) cooling with cooling water the canned food in the sterilizing kettle at the conclusion of the step of draining the warmed 95° C. hot water in the step (d), and removing from the sterilizing kettle the canned food that has been sterilized and cooled.

It must be noted that the temperature of the 95° C. hot water may range preferably between 93° C. to 97° C., and that the temperature of the 85° C. hot water may range preferably between 83° C. and 87° C.

BRIEF DESCRIPTION OF THE DRAWING

FIG. 1 shows a flow chart of a preferred embodiment of the present invention.

DETAILED DESCRIPTION OF THE PREFERRED EMBODIMENT

Referring to FIG. 1, a method embodied in the present invention is shown to include five sequential steps: air exhausting step, water draining and heating step, sterilizing step, heat recovering step, and cooling step.

In the air exhausting step, 95° C. hot water is injected by a pump 11 from a first reservoir 10 into a sterilizing kettle 100 containing therein canned food to be sterilized. The injecting step of the 95° C. hot water lasts until such time when the sterilizing kettle 100 is full of the 95° C. hot water. As the step of filling the sterilizing kettle 100 with the 95° C. hot water is under way, the air in the sterilizing kettle 100 is gradually expel via an exhaust valve (not shown in the drawing) located at the top of the sterilizing kettle 100 by the 95° C. hot water filling the sterilizing kettle 100. In the meantime, the body of the sterilizing kettle 100 and the canned food contained in the sterilizing kettle 100 are preheated by the 95° C. hot water filling the sterilizing kettle 100. As a result of the loss of heat by the 95° C. hot water in that preheating step described above, the 95° C. hot water is converted into 85° C. hot water.

In the water draining and heating step subsequent to the air exhausting step, the 85° C. hot water in the sterilizing kettle 100 is discharged via an exit port located at the bottom of the sterilizing kettle 100. The discharged 85° C. hot water is kept in a second reservoir 20. The draining of the 85° C. hot water lasts until such time when the sterilizing kettle 100 is free from the 85° C. hot water. Upon the completion of the draining of 85° C. hot water, a control valve of the exit port is closed. As soon as the draining of the 85° C. hot water is started, steam is introduced into the sterilizing kettle 100 via a steam inlet located at the top of the sterilizing kettle 100 until such time when the steam pressure in the sterilizing kettle 100 is greater than the atmospheric pressure. The injected steam brings about an increase in the temperature of the interior of the sterilizing kettle 100. The steam is introduced continuously into the sterilizing kettle 100 via a steam inlet located at the bottom of the sterilizing kettle 100, thereby resulting in an additional increase in the temperature of the interior of the sterilizing kettle 100.

At the conclusion of the water draining and heating step described above, the interior temperature of the sterilizing kettle 100 is caused to rise to arrive at a sterilizing level at which the living microorganisms in the canned food are killed. The interior temperature of the sterilizing kettle 100 must be kept at the sterilizing level for a predetermined period of time by introducing additional steam into the kettle 100 as the interior temperature of the kettle 100 falls to a certain value. It is possible that some of the steam may condense into water, which can be collected at the bottom of the sterilizing kettle 100 and discharged via a water draining valve disposed at the bottom of the sterilizing kettle 100.

As the step of sterilizing the canned food is brought to an end, the step of recovering the heat energy is initiated in time. Such a recovering step of the heat energy includes an operation in which the 85° C. hot water kept in the second reservoir 20 is pumped by means of a pump 21 to the top of the sterilizing kettle 100, from which the 85° C. hot water is sprayed into the sterilizing kettle 100 so as to cause the condensation of the steam into water and to cool uniformly and gradually the canned food so sterilized. As a result, the pressure differential between the inside and the outside of the can containing therein the sterilized food is kept to the minimum. Therefore, the method of the present invention does not call for an introduction of the compressed air into the sterilizing kettle 100 for maintaining a desired pressure in the sterilizing kettle 100, thereby resulting in a saving of energy. In the course of recovering heat energy by heat exchange, when the 85° C. hot water is converted in quantity into the 95° C. hot water, it can be discharged from the bottom of the sterilizing kettle 100 to the first reservoir 10. Therefore, the time that is required for the hot water to get into and get out of the sterilizing kettle 100 is shortened. It must be noted here that the introduction of the 85° C. hot water into the sterilizing kettle 100 is terminated at the time when the quantity of the introduced 85° C. hot water is about equal to the quantity of the 95° C. hot water that is used for the preheating and the air exhausting purposes in the air exhausting step.

As soon as the 95° C. hot water is drained completely in the heat recovering step described above, the draining valve is closed before the cooling step is started. In order to maximize the effect of cooling a stack of the canned food so sterilized in the sterilizing kettle 100, cooling water is sprayed at the top of the sterilizing kettle 100 into the interior of the sterilizing kettle 100. The temperature of the cooling water will not be caused to rise significantly in the cooling step in view of the fact that the canned food has already been cooled to a certain extent in the heat recovering step.

It is suggested that prior to the air exhausting step, the cans containing the canned food may be washed with the 95° C. hot water which is sprayed at the top of the sterilizing kettle 100 into the interior of the sterilizing kettle 100. The waste water produced in the washing of the cans is then discharged from the draining port located at the bottom of the sterilizing kettle 100. Additional clean water may be added to the second reservoir for making up the waste water discharged. By doing these, the hot water can be prevented from contaminated by the cans in the course of recycling the hot water.

The preferred embodiment of the present invention described above can be more readily appreciated and understood by comparing the test results obtained by the prior art method and the method embodied in the present invention. Such comparative studies are described in detail hereinafter.

According to the test done with the prior art method, steam was used in exhausting the air in a sterilizing kettle in which the canned beverage of tea was sterilized. The beverage in question was contained in a 350-gram can with a maximum net content of 330 grams. The canned beverage was sterilized in a horizontal sterilizing kettle having a 4-foot diameter and a 14-foot length. The horizontal sterilizing kettle was used to accommodate a total of 5,460 cans, which were arranged in groups of 13 cans×15 cans×7 levels on each of the four support frames in the horizontal sterilizing kettle, which was then saturated with steam so as to exhaust the air in the kettle. The air in the kettle was forced to escape via an air discharging valve located at the top of the kettle. The air exhausting step was allowed to last 7 minutes under a gauge pressure of 0.32 kg/cm². Upon the completion of the air exhausting step, the air discharging valve of the kettle was closed while the steam was introduced continuously into the kettle for about two minutes. As a result, the steam pressure in the kettle was caused to rise from a gauge pressure of 0.32 kg/cm² to a gauge pressure of 0.92 kg/cm². In the meantime, the temperature in the kettle was so increased as to arrive at a sterilization temperature of 118.5° C. This step is referred to as a heating step. The canned beverage was sterilized at that sterilization temperature under a gauge pressure of 0.92 kg/cm² for 20 minutes. At the conclusion of the sterilizing step, the introduction of the steam into the kettle was terminated. Thereafter, the air discharging valve was opened to allow the steam in the kettle to escape. Finally, the cans and the kettle were sprayed with cooling water. The test data were compiled and shown in the following Table 1.

TABLE 1

| test | quantity of steam used, kg | | | |
|------|---------------------|--------------|-------------------|-------|
|      | air exhausting step | heating step | sterilizing step  | total |
| 1    | 130                 | 36           | 51                | 217   |
| 2    | —                   | —            | —                 | 216   |
| 3    | —                   | —            | —                 | 217   |
| 4    | —                   | —            | —                 | 216   |
| 5    | —                   | —            | —                 | 213   |
| 6    | —                   | —            | —                 | 218   |
|      |                     |              | average           | 216   |

With the identical setup used in the test that was done with the prior art method and described above, the canned beverage was sterilized with the method of the present invention, in which hot water was employed to exhaust the air in the kettle.

According to the test done with the method of the present invention, 95° C. hot water was pumped from a first reservoir into the kettle until such time when the kettle was full of the 95° C. hot water, thereby indicating that the air in the kettle was completely exhausted via the air discharging valve located at the top of the kettle. In addition, the kettle was provided with an overflow pipe having a first water level sensor to indicate that the kettle was full of the hot water.

The signal that the kettle was full of the hot water was then transmitted to a steam control valve, which was subsequently activated so as to allow steam to enter the kettle, thereby resulting in an increase in the pressure in the kettle. As the pressure in the kettle was caused to rise to a level of 0.2 kg/cm² the water in the kettle was drained via a water exit located at the bottom of the kettle to a second reservoir. It must be noted here that the pressure of the steam control device was set at 0.2 kg/cm² and that the temperature of the drained hot water which was kept in the second reservoir was about 85° C.

The kettle was also provided with a water draining pipe having a second water level sensor for use in indicating the water level in the kettle. As the kettle was shown to be free from the water by the second water level sensor, the water draining valve was closed. The signal that the kettle was free from the water was then transmitted to the steam control device, which was subsequently activated to allow the steam to enter the kettle in which the temperature was caused to rise to the sterilization temperature of 118.5° C.

The canned beverage was sterilized at that sterilization temperature for 20 minutes before the introduction of the steam into the kettle was cut off. Thereafter, the cans and the kettle were sprayed with the 85° C. hot water which was kept in the second reservoir. When the kettle was almost half full of the water, the water draining valve located at the bottom of the kettle was then opened to allow the 95° C. hot water in the kettle to be drained and kept in the first reservoir. After one minute, the introduction of the 85° C. hot water into the kettle from the second reservoir was terminated. As soon as the 95° C. hot water was completely drained, the water draining valve was closed. Finally, the cans and the kettle were cooled with 30° C. cooling water for about 7 minutes. Thereafter, the 30° C. cooling water was drained out of the kettle so as to facilitate the removal of the canned beverage from the kettle. The test data were compiled and shown in the following Table 2.

TABLE 2

| test | quantity of steam used, kg | | | |
|---|---|---|---|---|
| | water draining and heating step | | sterilizing | |
| | water draining | heating | step | total |
| 7 | 75 | 41 | 30 | 146 |
| 8 | 66 | 41 | 30 | 142 |
| 9 | 68 | 46 | 26 | 140 |
| | | | | average 143 |

By comparing the data provided in Tables 1 and 2, the method of the present invention was shown to be more efficient than the prior art method in terms of the quantity of steam used, as indicated by the following computation:

$$\frac{216 - 143}{216} = 33.8\%$$

It is readily apparent that the method of the present invention consumes less quantity of steam by about 34%. In one cycle of the sterilization process done with the method of the present invention, it is estimated that two pumps consume the electricity in the amount of 7.5 HP×2×2.5 minutes, approximately corresponding to 0.5 kilowatt-hour. Therefore, the method of the present invention can make a great deal of difference in cost saving in a long-term operation.

The advantages inherent in the present invention over the prior art are summed up hereinafter.

The method embodied in the present invention is more energy efficient in view of the fact that the present invention uses less quantity of steam by making use of the 95° C. hot water in place of the steam in the step of exhausting the air in the kettle, and that the present invention makes use of the 85° C. hot water to recover the heat energy left over in the kettle at the conclusion of the sterilization step, and further that the present invention requires less quantity of cooling water.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claim.

What is claimed is:

1. A method of sterilizing canned food in a sterilizing kettle comprising the following steps of:
    (a) introducing 93°-97° C. hot water from a first reservoir into a sterilizing kettle containing therein canned food intended to be sterilized, so as to cause the air in the sterilizing kettle to be discharged until such time when the sterilizing kettle is substantially full of the 93°-97° C. hot water and when the air in the sterilizing kettle is substantially completely expelled, thereby resulting the temperature of the 93°-97° C. hot water dropping from 93°-97° C. to 83°-87° C. in view of the fact that the 93°-97° C. hot water is used to preheat the canned food as well as the sterilizing kettle;
    (b) draining completely said 83°-87° C. hot water from the sterilizing kettle to a second reservoir until such time when the sterilizing kettle is free of the 83°-87° C. hot water, and simultaneously injecting steam into the sterilizing kettle at the top of the sterilizing kettle at the time when the step of draining the 83°-87° C. hot water is started, so as to place the sterilizing kettle under a positive pressure preventing the atmospheric air from entering the sterilizing kettle;
    (c) continuing the injecting of the steam into the sterilizing kettle until such time when temperature in the sterilizing kettle reaches a predetermined level at which the living microorganisms in the canned food are killed and the canned food is sterilized, with the temperature in the sterilizing kettle being kept consistently at the predetermined level for a predetermined period of time before the step of injecting the steam into the sterilizing kettle is concluded;
    (d) then introducing the 83°-87° C. hot water from the second reservoir into the sterilizing kettle by spraying the 83°–87° C. hot water at the top of the sterilizing kettle to cool the steam in the sterilizing kettle and to cool the heated sterilizing kettle and the heated canned food, thereby causing the 83°–87° C. hot water to be warmed up to 93°–97° C., wherein the quantity of the 83°–87° C. hot water sprayed into the sterilizing kettle is about equal to the quantity of the 93°–97° C. hot water that was introduced into the sterilizing kettle in the step (a), and draining the warmed 93°–97° C. hot water at the bottom of the sterilizing kettle into the first reservoir; and (e) further cooling with cooling water the canned food in the sterilizing kettle at the conclusion of the draining of the warmed 93°–97° C. hot water in the step (d), and removing from the sterilizing kettle the canned food that has been sterilized and cooled.

* * * * *